INVENTORS
CHARLES WOOD AND
ARTHUR E. MEIXNER
BY
Harry G. Shapiro
ATTORNEY

United States Patent Office 3,142,986
Patented Aug. 4, 1964

3,142,986
THERMOELECTRIC DEW POINT HYGROMETER
Charles Wood, Maplewood, and Arthur E. Meixner, Hackensack, N.J., assignors, by mesne assignments, to Industrial Instruments, Inc., Cedar Grove, N.J., a corporation of New Jersey
Filed May 10, 1963, Ser. No. 279,369
3 Claims. (Cl. 73—336)

This invention relates to a dew point hygrometer, and more particularly to improved thermoelectric apparatus for determining dew point and the humidity of gases.

There are many ways of measuring the humidity of gases. The psychrometric method, employing dry and wet-bulb thermometers, is relatively simple, but there are many factors influencing the performance and accuracy of this method, namely, the sensitivity, accuracy and agreement in reading of the thermometers, the speed of air past the wet-bulb thermometer, radiation, the size, the shape, material and wetting of the wick, the relative position of the dry and wet-bulb thermometers, and the temperature and purity of the water used to wet the wick.

One of the best methods to determine the humidity of gases is to measure the dew point temperature. This is an absolute method. As first proposed by Regnault, the method employed two polished silver thimbles, one of which contained ether. Air was aspirated through the ether, causing the thimble to cool and dew to deposit on the surface. The temperature at which dew appeared (or disappeared on warming up) was measured by a mercury-in-glass thermometer and compared with the ambient temperature recorded by a thermometer in the other thimble.

Proposals for improving the Regnault scheme have employed other types of cooling, for example, solid carbon dioxide, liquid air, mechanical refrigeration, and more recently thermoelectric refrigeration. Moreover, it has been proposed to replace the visual observation of dew by photoelectric observation or control. In general, the dew point method has required complex and expensive apparatus, compared with the apparatus employed in psychrometry.

It is a principal object of the present invention to provide improved apparatus employing the dew point method.

A further object of the invention is to provide such apparatus having simplicity and economy comparable with apparatus employed in psychrometry, but without the disadvantages of psychrometry.

Another object of the invention is to provide improved apparatus for the measurement of dew point, and utilizing visual observation of dew, measurement of temperature by ordinary mercury-in-glass thermometers, and simple, manually controlled thermoelectric cooling of a reflecting surface.

A further object of the invention is to provide apparatus of the foregoing type wherein the temperature of the reflecting surface can be maintained at the dew point for considerable periods, sufficiently long for the thermometer to reach an equilibrium temperature and to permit unhurried observations of thermometer readings.

Yet another object of the invention is to provide apparatus of the foregoing type having an unusually simple energization circuit permitting adjustment of the magnitude of current flow and the direction of current flow for heating or cooling, so that the dew point can be accurately reached and maintained, even if the air is very humid or the ambient temperature is below freezing.

Still another object of the invention is to provide a unique thermoelectric module incorporating a mirror surface as a part of the module and arranged for association with a thermometer in such a way that the effects of temperature gradients are minimized.

Yet another object of the invention is to provide apparatus of the foregoing type incorporating a comparison reflecting surface located adjacent the primary reflecting surface but external of the thermoelectric circuit, whereby the desired formation of dew and undesired over-cooling may be readily detected.

Another object of the invention is to provide apparatus of the foregoing type having an efficient means for cooling the hot junctions of the thermoelectric module and for circulating air by a thermometer for measuring the ambient air temperature.

Yet another object of the invention is to provide apparatus of the foregoing type including a versatile power supply capable of energization from a D.C. or an A.C. source.

An additional object of the invention is to provide apparatus of the foregoing type which is light weight and compact and which may be readily accommodated in a small housing for portability.

Briefly stated, and without intent to limit the scope of the invention, the invention comprises a simple, efficient thermoelectric module including one or more normally cold junctions provided upon a body of conductive material having a reflecting surface upon which dew may form. A similar body with a reflecting surface is placed adjacent the first-mentioned body, but external to the cooling circuit, for comparison purposes. The normally hot junctions of the thermoelectric module are provided with cooling fins. The conductive body of the module is constructed to receive the bulb of a thermometer, the arrangement being such that the effects of temperature gradients are minimized. The module is energized for selective cooling or heating of its reflecting surface by a circuit which permits adjustment of the current magnitude and polarity. The power supply permits battery or converted A.C. to D.C. operation. The entire apparatus is contained within a compact housing which includes a fan for circulating air past the fins of the thermoelectric module and past an additional thermometer for measuring ambient air temperature.

The foregoing and other objects, advantages, and features of the invention, and the manner in which the same are accomplished will become more readily apparent upon consideration of the following detailed description of the invention taken in conjunction with the accompanying drawings, which illustrate a preferred and exemplary embodiment and wherein.

Figure 1:
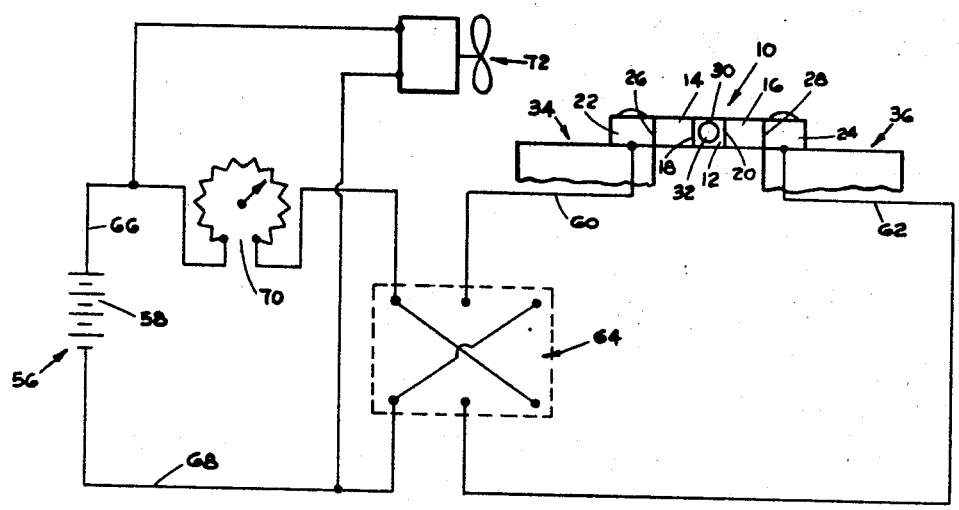
FIGURE 1 is a diagram of a simple circuit employed in the invention and includes an end view of a thermoelectric module.
Figure 2:
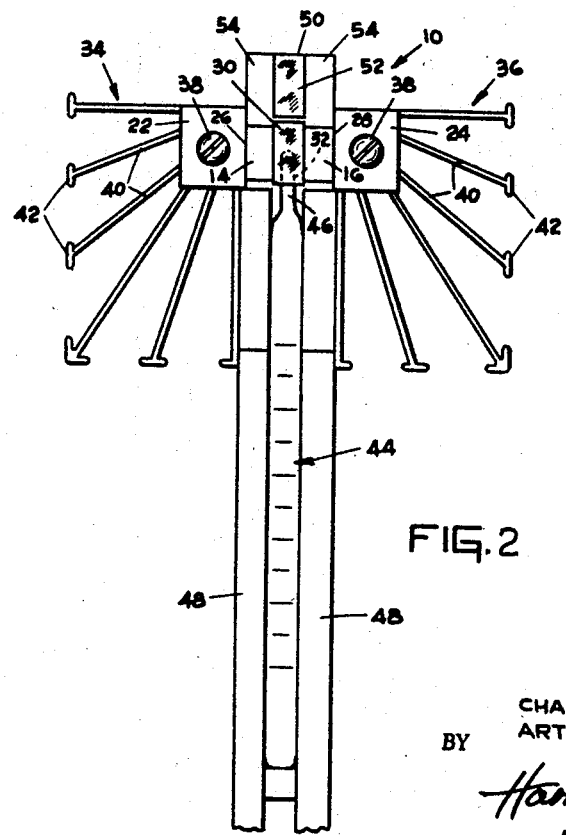
FIGURE 2 is a fragmentary plan view illustrating a thermoelectric module and associated apparatus employed in the invention.

Referring to the drawings, and initially to FIGURES 1 and 2 thereof, reference numeral 10 designates a thermoelectric module, which in the highly preferred form of the invention comprises a body 12 of electrically and thermally conductive material and a pair of bodies 14 and 16 of thermoelectric material. Body 12 is a block, rectangular in cross-section, and has a pair of parallel surfaces 18 and 20 juxtaposed with corresponding surfaces of bodies 14 and 16 to form thermoelectric junctions. The bodies 14 and 16 are also of rectangular block configuration. Electrically and thermally conductive heat sinks 22 and 24, of rectangular block configuration, are juxtaposed with surfaces of bodies 14 and 16 to form junctions 26 and 28 spaced from junctions 18 and 20.

The thermoelectric module operates in accordance with the well known Peltier effect, which was first discovered in connection with the passage of direct current through the junction of dissimilar metals. More recent and more efficient devices employing this effect utilize pairs of electrically dissimilar semi-conductive materials. Commonly, two pieces of dissimilar semi-conductive materials have adjacent ends bridged by a piece of highly conductive material to form the configuration of the Greek letter $\pi$. Conductive material is also attached to the other ends of the semi-conductive material. When a direct current is passed through this module, cooling is produced at one end of the semi-conductive material and heating at the other end.

In the preferred thermoelectric module of the invention, blocks 14 and 16 are formed of dissimilar semi-conductive material, so that if a direct current is passed between the heat sinks 22 and 24 through the module, cooling will be produced at junctions 18 and 20 and heating at junctions 26 and 28, or vice-versa, depending upon the direction of current. Blocks 14 and 16 may be selected from any of the well known semi-conductive materials employed in thermolectric junctions, for example, bismuth telluride, selenium telluride, lead telluride, or crystals such as silicon appropriately doped to provide a P-type semi-conductor for one block and an N-type semi-conductor for the other block. Block 12 and heat sinks 22 and 24 are formed of high thermal conductivity material, such as copper. The connections at junctions 18, 20, 26 and 28 may be provided by suitable and well known solder materials, such as an alloy of antimony, tin, and bismuth, in order to insure excellent electrical contact.

In accordance with the invention block 12 has a highly reflecting or mirror surface 30 in close proximity to the junctions 18 and 20, and exposed to view. To provide this reflecting surface, block 12 may be polished and plated with a noble metal, such as platinum or rhodium.

As will appear more fully hereinafter, block 12 must have substantial cross-dimensions in order to accommodate a bulb-type thermometer, which is inserted therein a bore 32 between junctions 18 and 20 and adjacent the mirror surface 30. It is desired that the thermometer measure with accuracy the temperature of the reflecting surface, and hence the effects of temperature gradients in the block 12 must be minimized. In accordance with the invention this is accomplished by embracing the block 12 between the semi-conductive bodies 14 and 16. Thus, in the form shown, the junctions 18 and 20 are at opposite sides of the block 12 and the reflecting surface 30 is at the top of the block, the heat sinks, semi-conductive bodies, and block 12 being aligned in the sequence illustrated.

Heat sinks 22 and 24 are attached to heat radiators 34 and 36, as by screws 38. Each radiator may comprise a plurality of divergent fins 40 having transverse terminal flanges 42. Fins 40 may extend integrally from a heat conductive block to which the heat sinks 22 and 24 are secured in heat conductive relation. As shown, the overall configuration of each radiator (including the flanged fins) is rectangular, so as to minimize space requirements.

As illustrated in FIGURE 2, a bulb-type thermometer 44, preferably a mercury-in-glass type, has its bulb 46 inserted into the bore 32 through one end of the mirror block 12, the bulb extending almost throughout the length of the block so as to obtain an accurate measurement of the temperature of the closely adjacent mirror surface 30. The thermometer may be supported between panels 48 of thermal-electrical insulation material and is exposed therebetween for viewing.

In close proximity with the mirror block 12 is a comparison mirror block 50 having a mirror surface 52 adjacent the mirror surface 30. Block 50, including its mirror surface, may be substantially identical to block 12, except that it need not have the bore 32. The block may be supported by a pair of panels 54 of thermal-electrical insulating material with a slight air space between blocks 12 and 50 or even with contact between blocks 12 and 50. Block 50 is external of the thermoelectric path between the heat sinks 22 and 24, that is, it does not form a part of the thermoelectric junctions of the module.

As shown in FIGURE 1, the thermoelectric module 10 is energized from a power supply 56 comprising a battery 58. Leads 60 and 62 extend from the heat sinks 22 and 24 (which serve as electrical connections for the thermoelectric module) to the center or blade terminals of a polarity reversing switch 64, which may be a conventional double-throw, double-pole manually actuated switch. The fixed switch terminals are cross-connected in a well known manner so as to permit selective reversal of the polarity of the connections between the terminals of battery 58 and leads 60 and 62, in order to select cooling or heating of the module mirror. The battery is connected to the reversing switch by leads 66 and 68, one of which has a rheostat 70 inserted therein to permit manual adjustment of the magnitude of the current flowing through the leads. A fan 72, driven by an electric motor connected to the battery terminals, serves to direct cooling air over the fins of the radiators 34 and 36.

Figure 3:
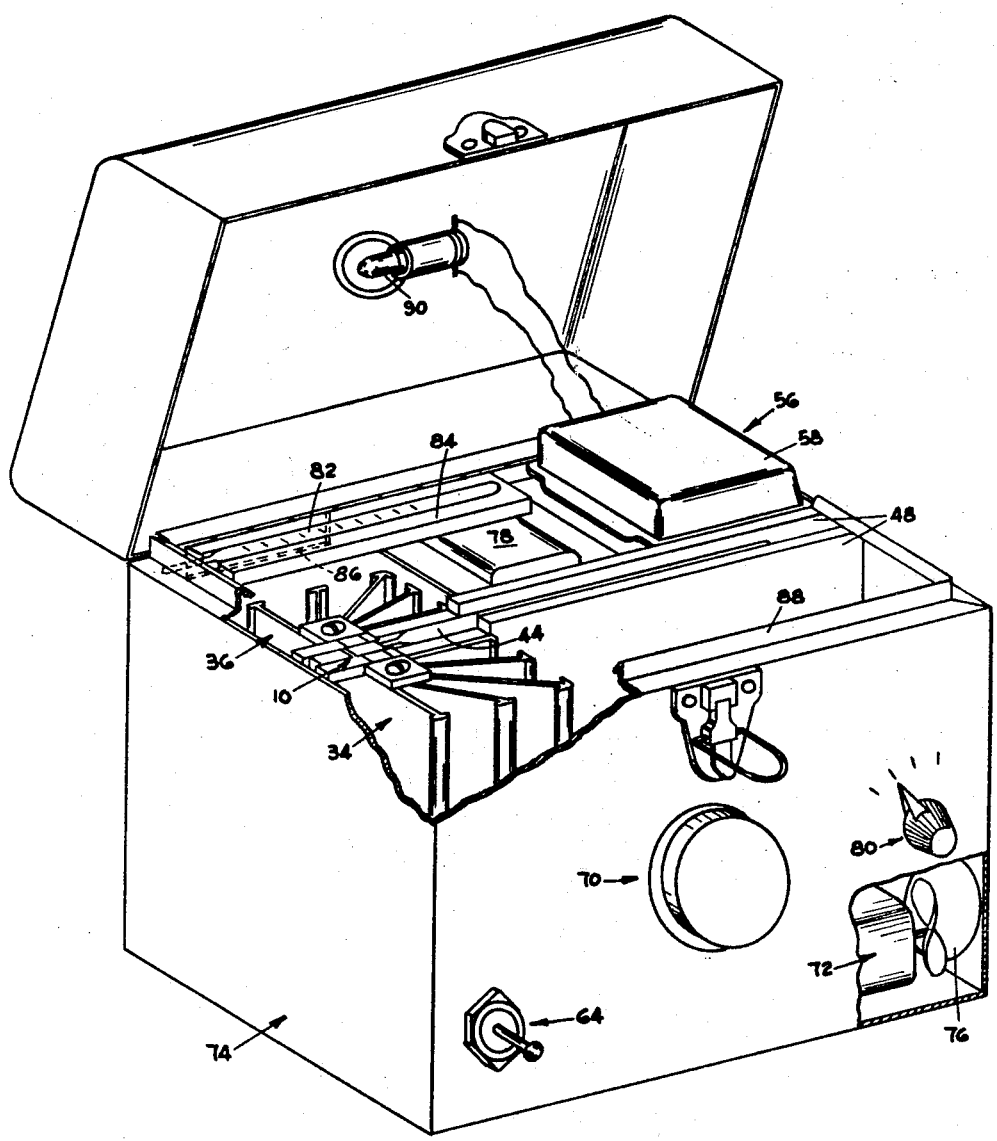
FIGURE 3 is a perspective view, partially broken away, illustrating the apparatus of the invention assembled in its housing.

The physical arrangement of the components of the invention in a compact portable housing 74 is shown in FIGURE 3. The radiators 34 and 36, with the intervening thermoelectric module 10 may be supported in the housing from the insulating panels 48, with the fins of the radiators arranged vertically and preferably spaced from the bottom of the housing to permit free circulation of cooling air, assisted by the fan 72 mounted adjacent an air outlet 76 at one side of the housing. The thermoelectric module, including the associated radiators, is substantially symmetrical about thermometer 44 which is arranged horizontally, like mirror surfaces 30 and 52, and which is disposed at the end of block 12 opposite block 50.

The power supply 56 includes the battery 58, which may be a lead-acid type for example, and a conventional converter 78 for providing D.C. from external A.C. lines. The knob of a multi-position master switch 80 is exposed at the front of the housing and may have positions corresponding to "off" (at which the apparatus is de-energized), "battery" (at which the apparatus is energized from the battery 58), "recharge" (at which the battery may be charged from A.C. supply lines through a conventional charging circuit), and "A.C." (at which the apparatus is energized from A.C. supply lines through the converter 78). The actuating lever of the reversing switch 64 and the control knob of the rheostat 70 may also be exposed for manual engagement at the front of the housing.

An additional thermometer 82, preferably of the mercury-in-glass type, is mounted on thermal insulation 84 adjacent an opening 86 in the rear wall of the housing and is exposed for viewing. This thermometer measures the ambient air temperatures. The apparatus within the housing is preferably covered by a sheet of transparent material, such as glass (not shown), which may fit under the top flange 88 of the housing and may have a cut-out for projection of the battery 58. The thermometers and the mirrors are thus readily observed. The cover of the housing may be hinged at the rear to the top of the housing and may support a pilot lamp 90 for indicating when the apparatus is energized, the lamp being exposed inside the cover and outside through a jewel mounted in the cover. For ease of portability, the housing may be closed and latched and provided with a suitable carrying handle.

In the operation of the apparatus of the invention, the master switch 80 may be moved to the "battery" position to energize the apparatus from the battery 58 of the power supply. Fan 72 will be energized concurrently with the thermoelectric module, and air will be drawn through opening 86 in the housing, over thermometer 82 and the fins of radiators 34 and 36, and forced out of opening 76. With the cover of the housing raised, the thermometers and the mirrors may be readily observed. Switch 64 will be initially set so that the current flow is in a direction to cool the mirror 30, and the rheostat 70 will be initially set, in accordance with experience, for an appropriate magnitude of current flow. When the mirror 30 has been cooled to the dew point temperature, dew will commence to form upon the mirror surface and may be observed by natural or artificial lighting. Rheostat 70 is adjusted to maintain a thin film of dew upon mirror 30. The resistance of the rheostat may be increased to the point where the dew just disappears and then decreased slightly to the point where the dew just appears, to obtain an accurate setting corresponding to dew point temperature. The existence of dew on mirror 30 may be determined with facility by comparison with the identical mirror surface 52 in close proximity. More important, if the initial current flow is set at too high a magnitude, so that excessive cooling and over-shooting of the dew point temperature occur, this condition may be readily determined by the formation of dew upon the "non-cooled" mirror surface 52 as well as upon the mirror surface 30. If this occurs, switch 64 is then reversed, so as to produce heating at mirror 30 and evaporation of the dew. The switch is then reversed again for re-cooling, and the rheostat 70 is set for less cooling than before, so that the dew point temperature may be attained without over-shoot.

With the construction of the invention, the dew point temperature at the block 12 may be maintained for a considerable period of time, by virtue of the adjustments just described, so that the mercury column of thermometer 44 will reach an equilibrium before readings are taken. The thermometer will thus give an accurate reading of dew point temperature, untainted by the effects of thermal lag. Thermometer 82 will likewise give an accurate reading of the ambient air temperature. It is unnecessary for the operator to make measurements based upon fleeting appearance of dew or frost on a reflecting plate, nor is it necessary for the operator to attempt to watch the reflecting plate and a temperature indicator at the same time. From the readings of the two thermometers, the relative humidity may be readily obtained by calculation or by the use of well known tables.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

The invention claimed is:

1. In a dew point hygrometer, a thermoelectric module having a metallic body of heat conductive material interposed between and in direct contact with a pair of spaced bodies of thermoelectric materials, said metallic body having a flat mirrored reflecting surface exposed to view and a bore therein close to said mirrored surface for receiving therein a temperature sensing element, and another metallic body of heat conductive material of substantially the same size as said first metallic body and having a flat-mirrored reflecting surface adjacent to and of substantially the same dimensions as and in the same plane with said first flat mirrored surface, means for supporting said two metallic bodies in physically spaced relationship such that said second metallic body is external to the path between said thermoelectric bodies through said first-mentioned metallic body, said second mirrored surface also being exposed to view for enabling a visual comparison between the two flat mirrored surfaces.

2. A dew point hygrometer according to claim 1, including heat sink means and heat transfer fins for said module, said temperature sensing elements comprising a thermometer having its bulb in said bore, and a second thermometer spaced from said first thermometer and adapted to measure ambient air temperature.

3. A hygrometer in accordance with claim 2 wherein said module is substantially symmetrical about said first-mentioned thermometer, the bulb of said first-mentioned thermometer entering the bore from one end of the first-mentioned conducting body and being confined in said bore.

References Cited in the file of this patent
UNITED STATES PATENTS

| | | |
|---|---|---|
| 2,624,195 | Van Alen | Jan. 6, 1953 |
| 2,758,470 | Hartmann | Aug. 14, 1956 |
| 2,894,391 | Colt et al. | July 14, 1959 |
| 2,979,950 | Leone | Apr. 18, 1961 |